(12) United States Patent
Lui et al.

(10) Patent No.: US 7,101,267 B2
(45) Date of Patent: Sep. 5, 2006

(54) TOOL HOLDER FOR POWER TOOL

(75) Inventors: Tat Nin Lui, Aberdeen (HK); Hong Sheng Xu, Shenzhen (CN)

(73) Assignee: Choon Nang Electrical Appliance Mfy., Ltd., Aberdeen (HK)

( * ) Notice: Subject to any disclaimer, the term of this patent is extended or adjusted under 35 U.S.C. 154(b) by 100 days.

(21) Appl. No.: 10/988,560

(22) Filed: Nov. 16, 2004

(65) Prior Publication Data

US 2006/0105687 A1    May 18, 2006

(51) Int. Cl.
   *B24B 23/00* (2006.01)
(52) U.S. Cl. .................................... 451/162; 451/356
(58) Field of Classification Search ............... 451/162, 451/164, 356, 359, 502, 504, 507, 514, 515, 451/521, 522, 523
See application file for complete search history.

(56) References Cited

U.S. PATENT DOCUMENTS 3,918,214 A * 11/1975 Buschman .................. 451/344
5,643,063 A    7/1997 Uzumcu et al.
6,857,948 B1 *  2/2005 Bocka et al. ............... 451/356

* cited by examiner

*Primary Examiner*—Jacob K. Ackun, Jr.
(74) *Attorney, Agent, or Firm*—Leydig, Voit & Mayer, Ltd.

(57) ABSTRACT

A holder for holding a tool implement for use with a power tool having a drive output member. The holder includes a pair of first and second supports for connection to the output member, a clamp member located between the supports, and a cam supported between the first support and the clamp member. The cam can be turned between an operative position, urging the clamp member towards the second support to hold the tool implement, and an inoperative position, releasing the clamp member for removal of the tool implement.

19 Claims, 4 Drawing Sheets

TOOL HOLDER FOR POWER TOOL

The invention relates to a holder for holding a tool bit or implement for use with a power tool, particularly, but not exclusively, an electric sander.

BACKGROUND OF THE INVENTION

In the majority of cases, power tools incorporate a holder at a drive output for detachably holding a tool implement, such as a chuck for an electric drill, or the clamping mechanism as disclosed in U.S. Pat. No. 5,643,063.

The present invention seeks to provide an improved or new tool implement holder.

SUMMARY OF THE INVENTION

According to the invention, there is provided a holder for holding a tool implement for use with a power tool including a drive output member. The holder comprises a pair of opposed first and second supports for connection to said drive output member, a clamp member located between the supports, and a manually operable cam supported between the first support and the clamp member. The cam is supported for angular movement between an operative position urging the clamp member towards the second support to thereby hold said implement and an inoperative position releasing the clamp member to permit removal of said implement.

Preferably, the clamp member has a pair of opposed first and second jaws facing the first and second supports respectively, and the cam is supported between the first support and the first jaw for angular movement between said operative position urging the first jaw towards the second jaw to thereby hold said implement by a part thereof inserted into the clamp member and an inoperative position releasing the first jaw.

More preferably, the clamp member is resilient with its first and second jaws sprung at an acute angle apart.

It is preferred that the cam has an axis of angular movement extending alongside the first jaw.

It is further preferred that the clamp member is elongate along its jaws, and the axis of the cam is substantially parallel to the length of the clamp member.

It is yet further preferred that the cam is elongate along its axis.

It is yet further preferred that the cam has a plurality of discrete parts engageable with the first jaw.

Preferably, the cam is supported by or adjacent the first support for angular movement.

In a preferred embodiment, the first and second supports are provided by opposed side walls of an elongate channel member.

More preferably, the channel member includes opposite end walls having respective aligned holes through which the cam extends for support thereby.

More preferably, the cam includes an operator by which the cam is manually movable, the operator being positioned at one end of the channel member.

More preferably, the channel member and the clamp member have respective webs that are connected together.

Further more preferably, the webs are connected together by at least one screw-threaded connector extending therethrough.

It is preferred that the first jaw has at least one outer recess for engagement by the cam through a snap action to maintain the cam in its operative position.

It is preferred that at least one of the jaws has at least one inner protrusion for engaging the part of said implement.

It is preferred that the second jaw lies against the second support.

It is preferred that the holder includes at least one connector for connecting the supports to said drive output member.

It is further preferred that the connector comprises a screw-threaded connector extending through a web bridging across the supports.

The invention also provides a power tool incorporating the aforesaid holder, including a drive output member to which the holder is connected, and a mechanical power source adapted to set the drive output member into linear reciprocation.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
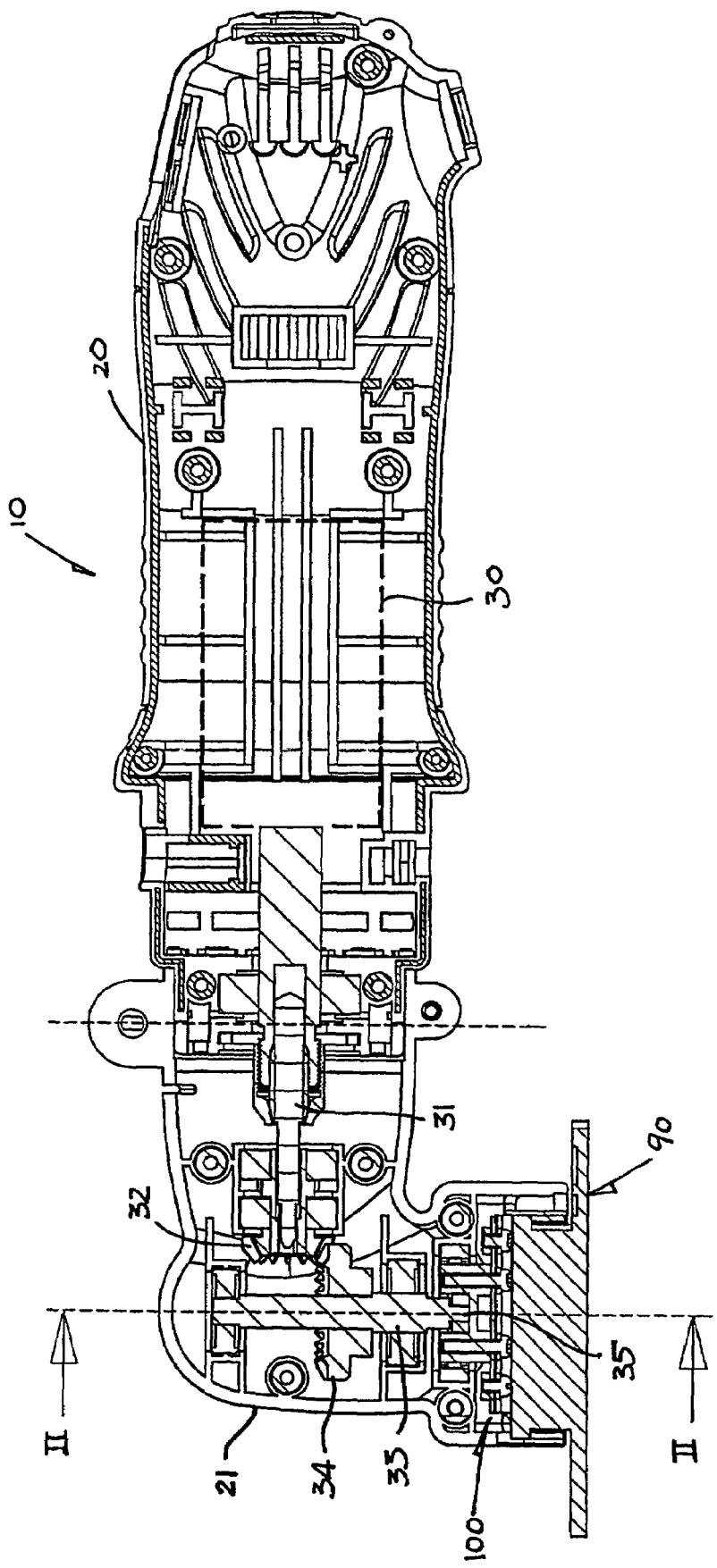
FIG. 1 is a cross-sectional side view of a power tool incorporating an embodiment of a tool implement holder in accordance with the invention, the holder holding a tool implement.
Figure 2:
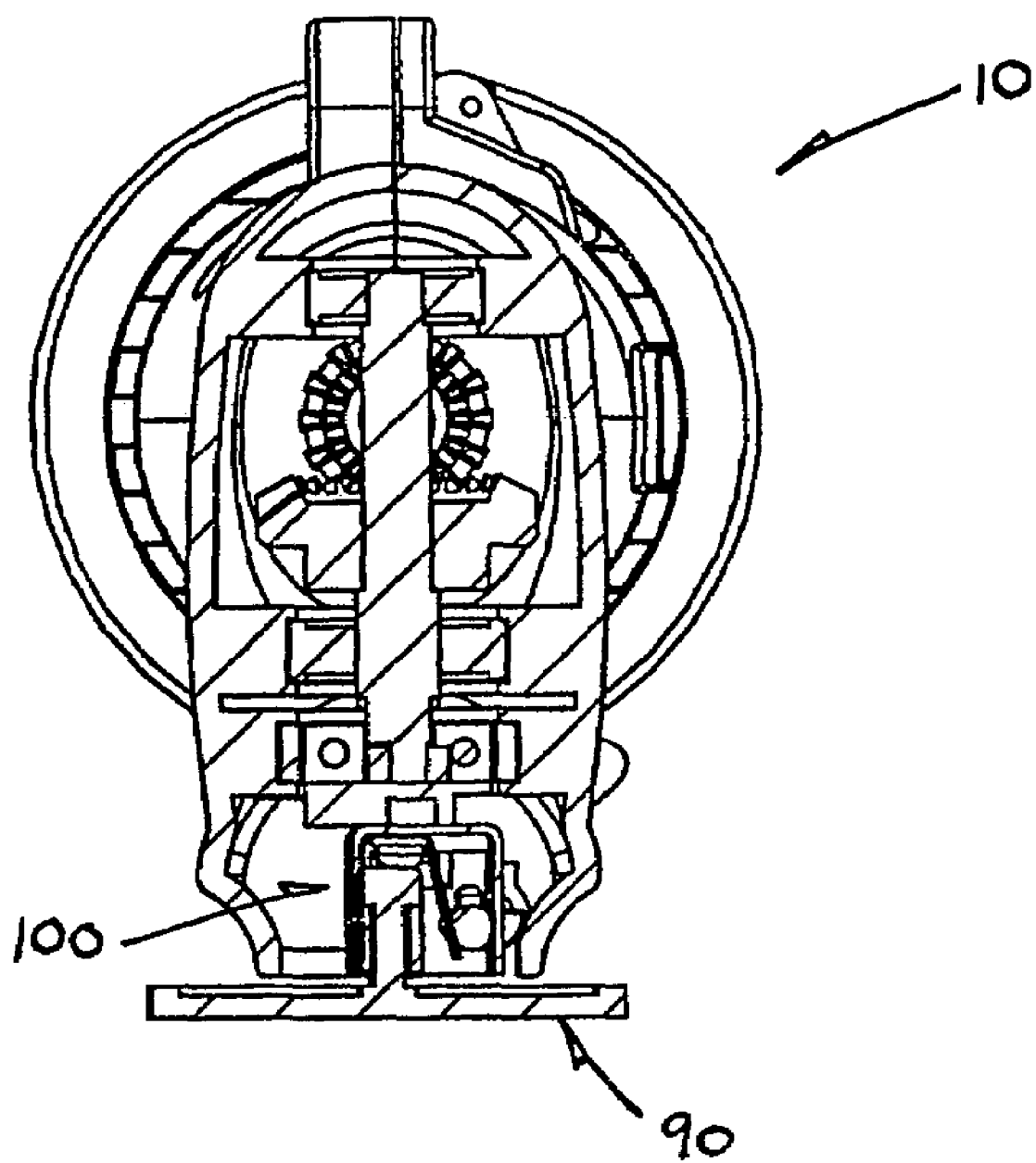
FIG. 2 is a cross-sectional end view of the assembly of FIG. 1, taken along line II—II.
Figure 3:
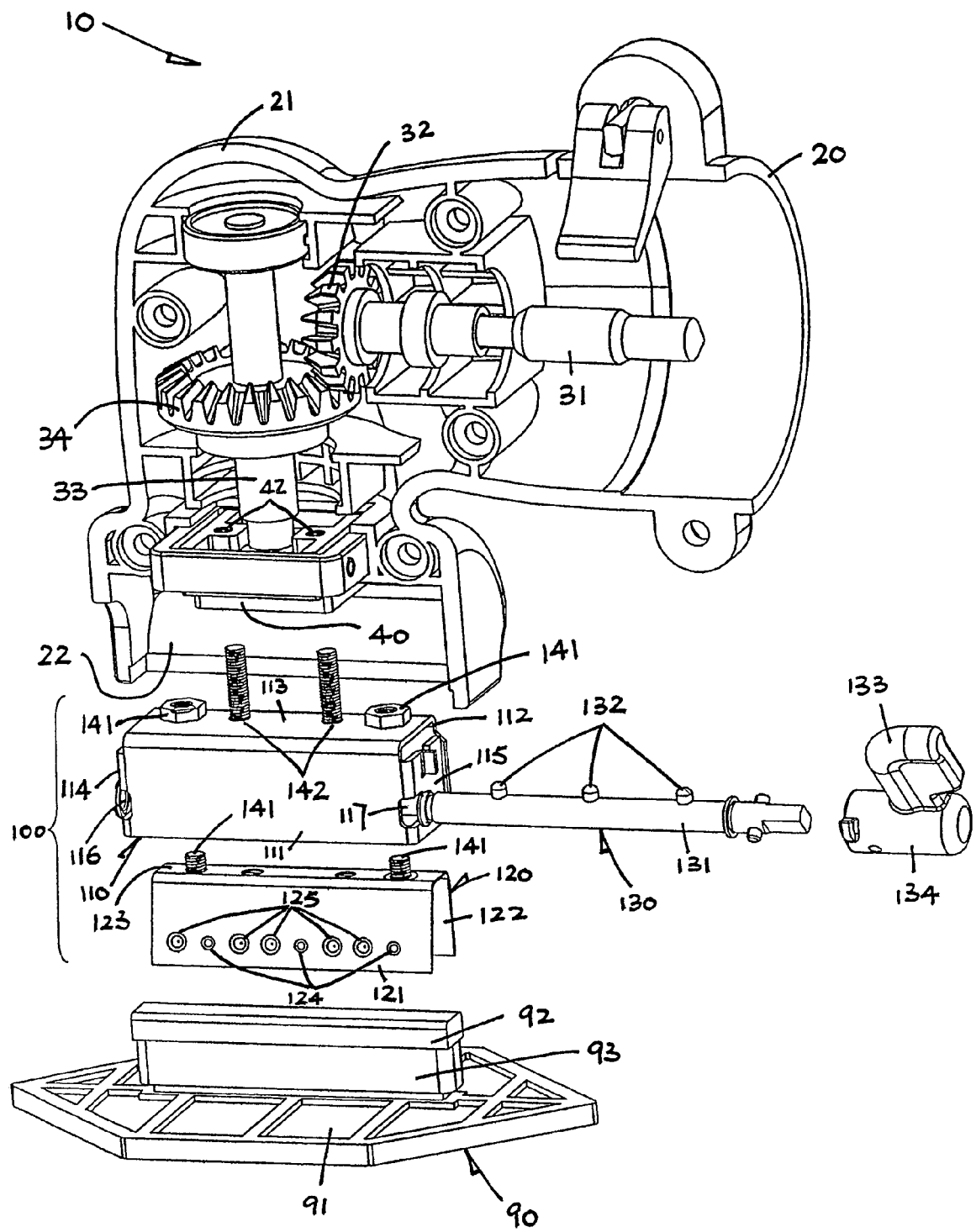
FIG. 3 is an exploded perspective view of a front end of the power tool and the holder with tool implement of FIG. 1.

Referring to the drawings, there is shown a power tool in the form of a handheld electric sander 10 that incorporates a holder 100 embodying the invention for holding a sanding implement 90. The sander 10 has an oblong casing 20 housing an electric motor with associated speed-reduction gearbox 30 whose longitudinal output shaft 31 is in drive engagement with a transverse output shaft 33 via intermeshing bevel gears 32 and 34. The second shaft 33 has, as extending axially from at its free end, an eccentric post 35 that engages a drive output member 40.

The output member 40 is accessible through a side opening 22 at a front end 21 of the casing 20, and is supported and guided for linear sliding movement in opposite directions parallel to the longitudinal axis of the sander 10. The holder 100 is releasably attached to the output member 40 for simultaneous reciprocating movement thereby.

The sanding implement 90 has an oblong hexagonal flat base 91, against the underside of which a sanding paper is mounted flat, and includes a rectangular wall-like stem 92 upstanding centrally from the base 91. Opposite surfaces of the stem 92 are inlaid with rubber strips 93. The holder 100 connects the sanding implement 90 by its stem 92 to the sander output member 40 for reciprocation thereby to sand a workpiece.

The tool implement holder 100 comprises an elongate rigid channel member 110, an elongate resilient clamp member 120 and a manually operable elongate cam 130 provided between the channel member 110 and the clamp member 120. The clamp member 120 is located wholly within the channel member 110, between which the cam 130 co-acts for tightening the clamp member 120 to hold the sanding implement 90 by its stem 92.

The channel member 110 has a right rectangular inverted U-shaped cross-section, comprising a pair of left and right side walls 111 and 112, a web 113 bridging across the top edges of the side walls 111 and 112, and opposite front and rear end walls 114 and 115. The clamp member 120 has a generally rectangular inverted U-shaped cross-section, comprising a pair of left and right side walls or jaws 121 and 122 and a web 123 bridging across the top edges of the jaws 121 and 122.

The clamp member 120 is about half as wide as the channel member 110 and is located on the right side therein, with its right jaw 122 lying snug against the right wall 112 of the channel member 110 and its left jaw 121 facing the left channel wall 111 across a gap. A pair of bolts and nuts 141 is tightened through both webs 123 and 113, at opposite ends thereof, to fix the clamp member 120 to and within the channel member 110. The clamp member 120 is resilient with its jaws 121 and 122 sprung at an acute angle apart to facilitate insertion of the stem 92 of the sanding implement 90 from below.

The cam 130 has a straight shaft 131 bearing on one side thereof a series of three discrete radially protruding studs 132 at equal intervals, and includes a radially extending operating handle 133 fixed to one end of the shaft 131 by means of an end cap 134. By extending through aligned holes 116 and 117 in opposite end walls 114 and 115 of the channel member 110 adjacent its left wall 111, the shaft 131 is supported in the gap between the left channel wall 111 and the left clamp jaw 121 for angular movement about its longitudinal central axis. The shaft 131 extends with its axis alongside the left clamp jaw 121 and, more specifically, parallel to the length of the clamp member 120.

The cam handle 133 is situated outside the rear end wall 115 of the channel member 110 for manual pivoting in either direction to turn the shaft 131 and hence its studs 132 to perform a cam action upon the left jaw 121 of the clamp member 120.

Figure 4:
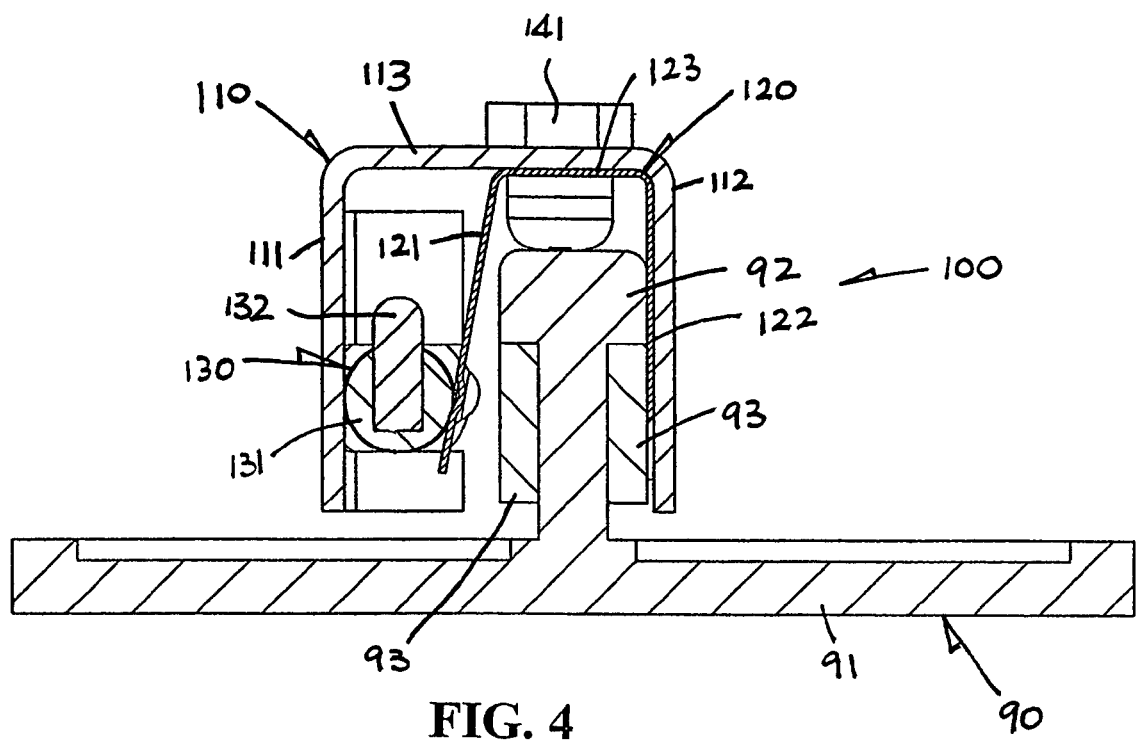
FIG. 4 is an enlarged cross-sectional end view of the holder with tool implement of FIG. 2, the holder being in an unlocked position.
Figure 5:
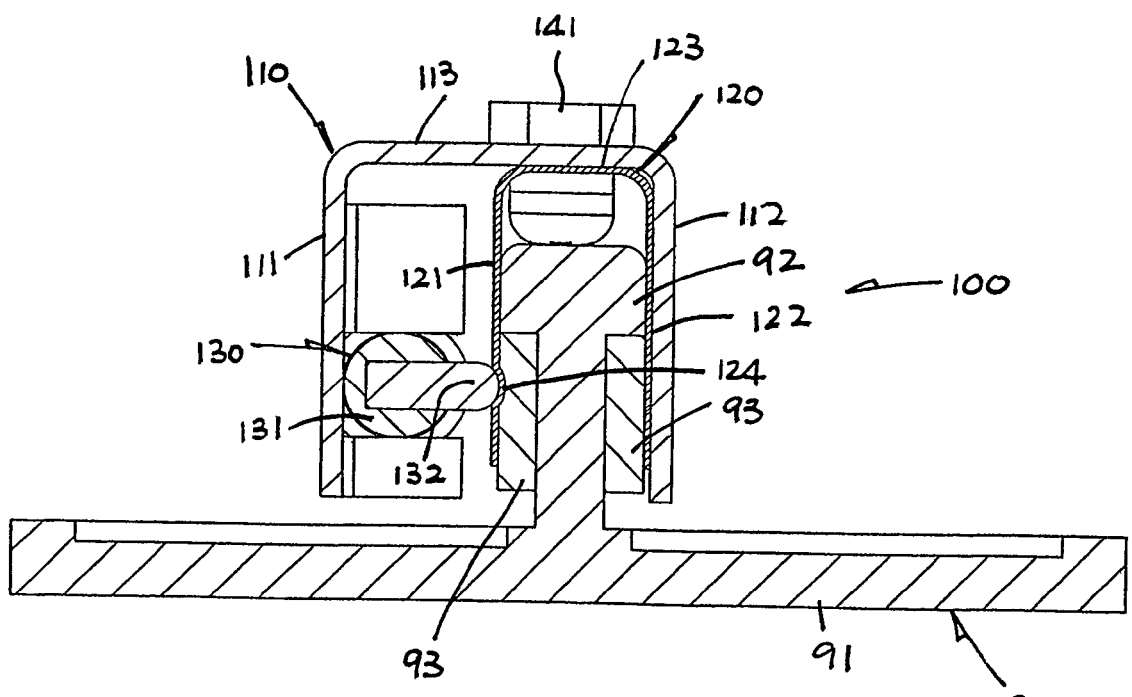
FIG. 5 is a cross-sectional end view corresponding to FIG. 4, showing the holder in a locked position.

The shaft 131 together with its studs 132 can be turned in opposite directions between an operating/locking position (FIG. 5) and an inoperating/unlocking position (FIG. 4). In the locking position, the studs 132 engage and thus urge to pivot the left jaw 121 of the clamp member 120 about its web 123 inwards, thus pressing the left jaw 121 closer to the right jaw 122 to thereby clamp the sanding implement 90 by its stem 92 inserted into the clamp member 120. The right wall 112 of the channel member 110 supports or backs the right clamp jaw 122 for clamping. Upon being turned back to the unlocking position, the studs 132 release the left clamp jaw 121, whereby the clamp member 120 widens by virtue of its resilience to permit removal of the sanding implement 90.

The left jaw 121 of the clamp member 120 has a series of three indentations 124 on its outer side, which are aligned with respective studs 132 of the cam shaft 131 for engagement thereby through a snap action to thereby maintain the cam 130 in the locking position. On its inner side, the left jaw 121 has a row of protrusions 125, similar to the indentations 124 but slightly larger in diameter, for pressing into the adjacent rubber strip 93 of the stem 92 to enhance gripping of the sanding implement 90 especially in either longitudinal direction. For this purpose, the right jaw 122 may be formed with equivalent biting protrusions.

Overall, the tool implement holder 100 is fixedly connected to the output member 40 of the sander 10 from below by another pair of bolts 142 which extends through the middle section of the inter-connected webs 123 and 113 and is tightened into or through respective screw-threaded holes 42 of the output member 40.

It is envisaged that the clamping member 120 may be simplified into a flat rigid member which is pivotable or slidable and acts like the left jaw 121 and co-operates with the right channel wall 112 to clamp a tool implement. The cam 130 may be supported direct by the left wall 111 of the channel member 110, for example by folded-in parts thereof.

The invention has been given by way of example only, and various other modifications of and/or alterations to the described embodiment may be made by persons skilled in the art without departing from the scope of the invention as specified in the appended claims.

The invention claimed is:

1. A holder for holding a tool implement for use with a power tool including a drive output member, comprising:
   opposed first and second supports for connection to the drive output member;
   a clamp member located between the first and second supports; and
   a manually operable cam supported between the first support and the clamp member for angular movement between an operative position, urging the clamp member towards the second support to hold a tool implement, and an inoperative position, releasing the clamp member to permit removal of the tool implement.

2. The holder as claimed in claim 1, wherein the clamp member has opposed first and second jaws facing the first and second supports, respectively, and the cam is supported between the first support and the first jaw for angular movement between the operative position, urging the first jaw towards the second jaw to hold the tool implement at a part of the tool implement inserted into the clamp member, and an inoperative position, releasing the first jaw.

3. The holder as claimed in claim 2, wherein the clamp member is resilient and the first and second jaws are sprung apart at an acute angle.

4. The holder as claimed in claim 2, wherein the cam has an axis of angular movement extending alongside the first jaw.

5. The holder as claimed in claim 4, wherein the clamp member is elongate along the first and second jaws, and the axis of the cam is substantially parallel to a length direction of the clamp member.

6. The holder as claimed in claim 5, wherein the cam is elongate along the axis of the cam.

7. The holder as claimed in claim 6, wherein the cam includes a plurality of discrete parts engageable with the first jaw.

8. The holder as claimed in claim 1, wherein the cam is supported by or adjacent to the first support for angular movement.

9. The holder as claimed in claim 1, wherein the first and second supports are provided by opposed side walls of an elongate channel member.

10. The holder as claimed in claim 9, wherein the channel member includes opposite end walls having respective aligned holes through which the cam extends for support by the channel member.

11. The holder as claimed in claim 9, wherein the cam includes an operator by which the cam is manually movable, the operator being positioned at an end of the channel member.

12. The holder as claimed in claim 9, wherein the channel member and the clamp member include respective webs that are connected together.

13. The holder as claimed in claim 12, including at least one screw-threaded connector extending through and connecting the webs together.

14. The holder as claimed in claim 2, wherein the first jaw has at least one outer recess for engagement by the cam through a snap action to maintain the cam in the operative position.

15. The holder as claimed in claim 2, wherein at least one of the first and second jaws has at least one inner protrusion for engaging the part of the tool implement.

16. The holder as claimed in claim 2, wherein the second jaw lies against the second support.

17. The holder as claimed in claim 1, including at least one connector for connecting the first and second supports to the drive output member.

18. The holder as claimed in claim 17, wherein the connector comprises a screw-threaded connector extending through a web bridging the first and second supports.

19. A power tool incorporating the holder as claimed in claim 1, including a drive output member to which the holder is connected, and a mechanical power source moving the drive output member in linear reciprocation.

* * * * *